F. W. LAMB.
Gate.
No. 229,147. Patented June 22, 1880.
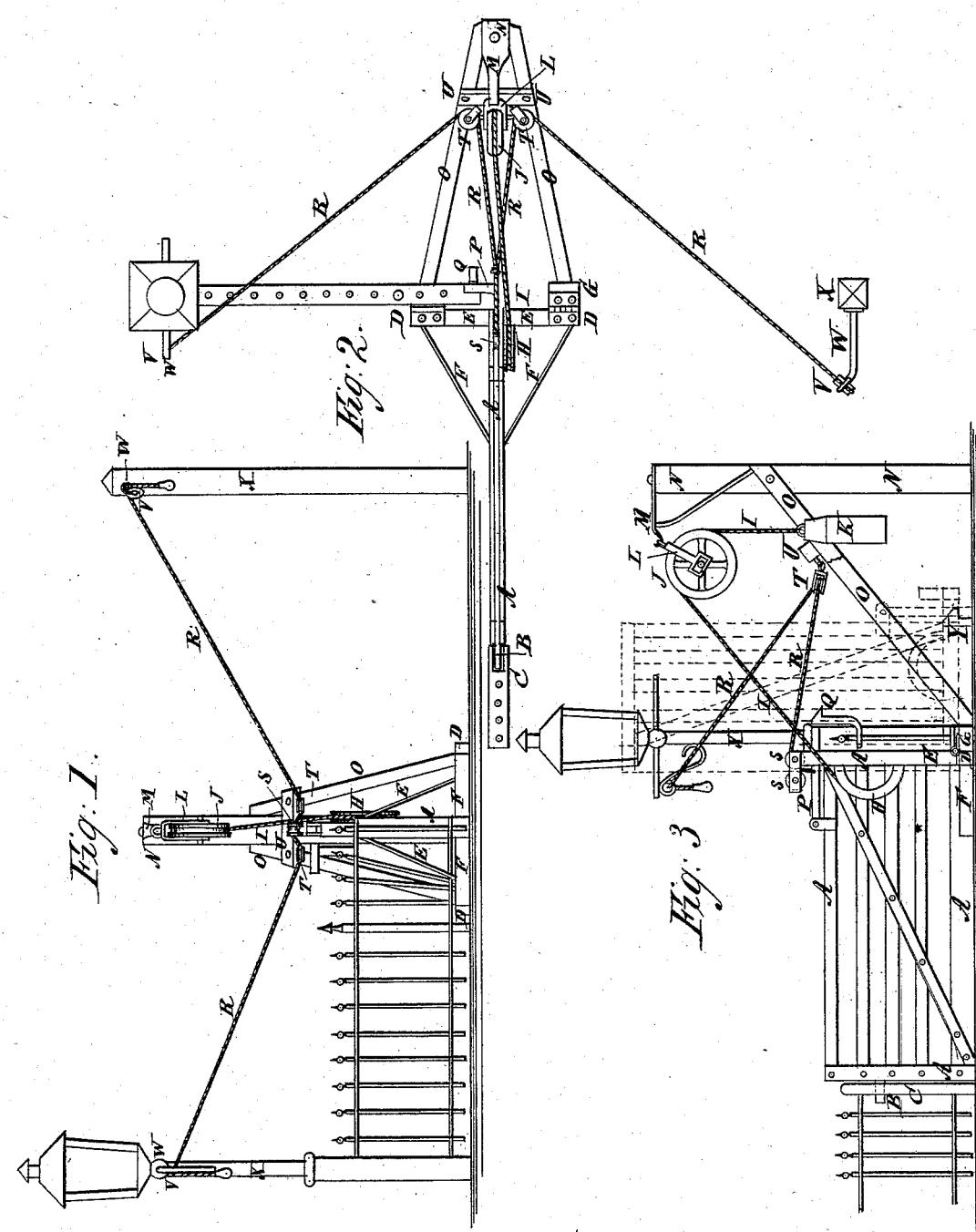
WITNESSES:
A. Schehl.
C. Sedgwick
INVENTOR:
F. W. Lamb
BY Munn & Co
ATTORNEYS.

UNITED STATES PATENT OFFICE.

FRANKLIN W. LAMB, OF HYDESVILLE, CALIFORNIA.

GATE.

SPECIFICATION forming part of Letters Patent No. 229,147, dated June 22, 1880.

Application filed November 20, 1879.

*To all whom it may concern:*

Be it known that I, FRANKLIN WILLIAM LAMB, of Hydesville, in the county of Humboldt and State of California, have invented a new and useful Improvement in Gates, of which the following is a specification.

Figure 1 is an end elevation of my improved gate. Fig. 2 is a plan view. Fig. 3 is a side elevation.

This invention relates to that class of gates that are operated by a system of cords and pulleys; and its object is to enable the gate to be easily opened and closed, and to support it firmly in all positions.

Similar letters of reference indicate corresponding parts.

A represents the gate, which may be made of any desired style. To the forward end of the gate is attached an arm, B, which drops into a slot in the upper end of the front post, C, and holds the gate against lateral pressure when closed. To the lower end of the rear end bar of the gate A is attached the center of the cross-bar D, which is strengthened by the two pairs of braces E F. The lower ends of the braces E are attached to the end parts of the cross-bar D, and their upper ends are attached to the rear end bar of the gate A.

The outer ends of the braces F are attached to the end parts of the cross-bar D, and their inner ends are attached to the bottom bar of the gate A.

The end parts of the cross-bar D are hinged to the upper ends of two short posts, G, set in the ground, so that the gate will be opened by turning it up upon its rear end. The cross-bar D and braces E F thus support the gate A firmly in all its positions, hold it from lateral movement, and strengthen it against lateral pressure. To one side of the rear end of the gate A is attached a semicircle, H, which is grooved upon its convex side, and to its lower part is attached the end of a rope or chain, I. The rope or chain I passes over a large pulley, J, and has a weight, K, attached to its rear end. With this construction the weight K has a tendency to start the gate open when closed, and to start it shut when open, thus making it more easy to operate the gate.

The pivots of the pulley J work in short cross-slots in the ends of the U-bar L, along which slots the said pivots roll as the gate is opened and shut to lessen the friction.

The U-bar L is hung at its bend from an arm or bracket, M, attached to the upper end of the post N, which is set in the ground in the rear of and in line with the gate A. The post N is strengthened in position by the inclined braces O, the upper ends of which are attached to the upper part of the said post N. The lower ends of the braces O rest against and are secured to the short posts G, to which the cross-bar D of the gate A is hinged.

To the top bar of the gate A, at a little distance from its rear end, is hinged the forward end of the latch P, which passes back between the upper ends of the parts of the rear end bar of the gate A, projects at the rear of the gate A, and is bent to one side at right angles, so as to engage with the catch Q, attached to a post of the fence or other suitable support, to fasten the gate shut and prevent it from being opened by animals.

To the latch P is attached the end of a cord or chain, R, which passes up between the two pulleys S, pivoted to and between the upper ends of the parts of the rear end bar of the gate A, or between two short bars attached to said ends.

At a little distance from the pulleys S the cord or chain R is branched and passes around two pulleys, T, pivoted to the end parts of a cross-bar, U, attached to the braces O. From the pulleys T the cords or chains R pass around pulleys V, pivoted to arms W, attached to the upper ends of posts X, set in the ground at the side of the roadway, and at such a distance from the gate A that a person in a vehicle can grasp the ends of the cords or chains R to open and close the gate A. When the gate A is opened the latch P engages with a catch, Y, attached to a short post or other support set in the ground at the rear of the gate A, as shown in Fig. 2.

With this construction, by giving a sharp pull upon the end of either of the cords or chains R and then releasing it, the gate A will be raised, and the impulse thus given to it will carry it into an erect position, where it will be caught and held by the catch Y. The gate is closed in the same manner by pulling upon one of the cords R, which releases the gate from the catch Y and carries it past its center of gravity, whence it drops into place by its own weight.

It will be observed that the first effect when the cord or chain is pulled is to release the latch P from its catch, and the second effect is to move the gate.

Having thus fully described my invention, I claim as new and desire to secure by Letters Patent—

1. The combination, with the heel-hinged gate A, of the grooved semicircle H, the rope I, the pulley J, and the balancing-weight K, substantially as herein shown and described, to balance the gate, so that it can be more easily opened and closed.

2. The combination, with the gate A, of the latch P, the catches Q Y, the pulleys S T V, and the cords R, substantially as herein shown and described, whereby the gate may be opened and closed, as set forth.

FRANKLIN WILLIAM LAMB.

Witnesses:
SAML. BALLENTINE,
M. LEVINGER.